(12) United States Patent
Grubb

(10) Patent No.: US 8,798,671 B2
(45) Date of Patent: Aug. 5, 2014

(54) DUAL MODE APPARATUS AND METHOD FOR WIRELESS NETWORKING CONFIGURATION

(75) Inventor: David Grubb, Doylestown, PA (US)

(73) Assignee: Motorola Mobility LLC, Chicago, IL (US)

( * ) Notice: Subject to any disclaimer, the term of this patent is extended or adjusted under 35 U.S.C. 154(b) by 673 days.

(21) Appl. No.: 11/460,121

(22) Filed: Jul. 26, 2006

(65) Prior Publication Data

US 2008/0026745 A1 Jan. 31, 2008

(51) Int. Cl.
*H04M 1/00* (2006.01)
(52) U.S. Cl.
USPC ....... 455/552.1; 455/411; 455/41.2; 370/338; 709/222; 709/227
(58) Field of Classification Search
USPC .......... 455/410, 419, 41.2, 550.1, 552.1, 557, 455/411, 435.1; 370/338; 709/220, 222, 709/227, 228
See application file for complete search history.

(56) References Cited

U.S. PATENT DOCUMENTS

| 7,158,756 B2 * | 1/2007 | Palin et al. .................. 455/41.2 |
| 2006/0083187 A1 * | 4/2006 | Dekel ........................... 370/310 |
| 2006/0198448 A1 * | 9/2006 | Aissi et al. .................... 375/259 |

* cited by examiner

*Primary Examiner* — Marcos Torres
(74) *Attorney, Agent, or Firm* — Leydig, Voit & Mayer, Ltd.

(57) ABSTRACT

A wireless networking system and method for wireless network configuration of dual mode wireless networking devices, such as a dual mode cordless telephone base station and one or more dual mode wireless network client devices. The dual mode wireless networking device includes a radio transceiver, a wireless network transceiver and a controller coupled therebetween. The dual mode devices wirelessly exchange network configuration data, via their respective radio transceivers, in response to the initiation of a wireless pairing between the devices by an end user. Within each device, the received network configuration data is transferred from the radio transceiver to the wireless network transceiver. The devices then establish a wireless networking communication or networking link, via their wireless network transceivers, based on the network configuration data exchanged therebetween. Upon such link being established, the client device is associated with the base station device and authenticated within the wireless network.

20 Claims, 3 Drawing Sheets

DUAL MODE APPARATUS AND METHOD FOR WIRELESS NETWORKING CONFIGURATION

BACKGROUND OF THE INVENTION

1. Field of the Invention

The invention relates to dual mode wireless networking devices. More particularly, the invention relates to configuring wireless networking in dual mode wireless devices, such as configuring 802.11x wireless networking in dual mode cordless telephone devices.

2. Description of the Related Art 802.11 or 802.11x refers to an evolving family of standards or specifications developed by the Institute of Electrical and Electronics Engineers (IEEE) for wireless local area network (LAN or WLAN) technology. The 802.11 standard specifies an over-the-air interface between a wireless client device and a base station or between two wireless clients devices. Specifications within the 802.11x family include, e.g., 802.11a, 802.11b, 802.11g.

Conventional wireless networking equipment used in accordance with the 802.11x family of standards, and other wireless standards, typically are relatively difficult for end users to set up properly. Such wireless networking devices include, e.g., desktop and laptop personal computers (PCs), PC printers, wireless routers, digital cameras and personal digital assistants (PDAs). In particular, security settings for such devices often are relatively difficult to set up within conventional wireless networking arrangements because, among other reasons, there are many different security standards or protocols, e.g., Wired Equivalent Privacy (WEP) and Wi-Fi Protected Access (WPA), that many end users often do not understand. Consequently, end users often do not use or even activate many of the security features available for wireless network devices, including those available for 802.11x wireless network devices.

DETAILED DESCRIPTION

Figure 1:
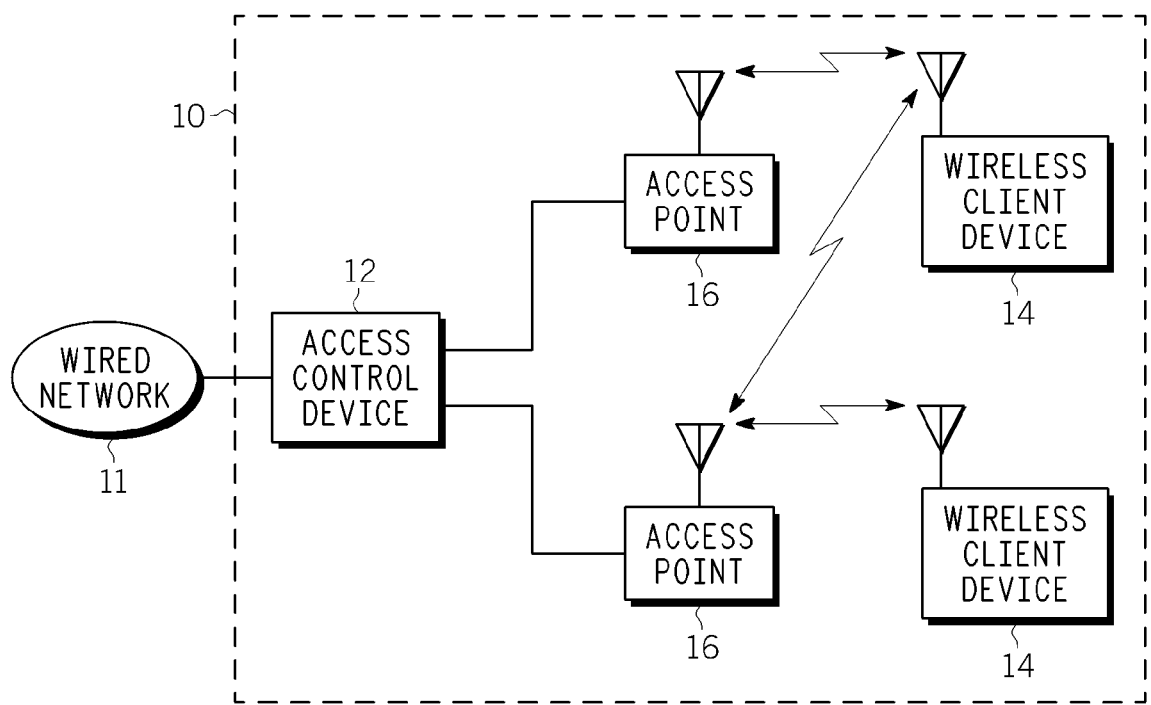
FIG. 1 is a block diagram of a conventional wireless networking system, such as a wireless local area network (WLAN) arrangement.

In the following description, like reference numerals indicate like components to enhance the understanding of the wireless networking configuration method, device and system through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Referring to FIG. 1, shown is a block diagram of a conventional wireless networking system 10, such as a wireless local area network (WLAN) system or arrangement. The system 10 includes an access control device 12 and one or more wireless client devices 14 configured to be wirelessly coupled to the access control device 12. The system 10 also may include one or more access points or wireless access points 16 coupled to the access control device 12.

In general, an access point is any suitable device that connects wireless devices together to form a wireless network. A wireless access point usually connects (via the access control device) to a wired network 11, such as the Internet or other wired network, and transmits data between wireless devices and a wired network or wired device. However, many wireless routers include a wireless access point. Therefore, if the access control device 12 is a wireless router that includes a wireless access point, the system 10 may not include separate access points 16.

The wireless client devices 14 can be any suitable wireless network or networking device that can connect, communicate and exchange information wirelessly with other devices and/or networks in a relatively secure and inexpensive manner, e.g., using short range radio frequency (RF). Such devices include, e.g., desktop personal computers (PCs), laptop or notebook PCs, PC printers, digital cameras and personal digital assistants (PDAs).

As discussed hereinabove, many conventional wireless networking devices, including 802.11x networking devices, are difficult to set up correctly for use within a given wireless network. For example, security settings often are relatively difficult to set up within and between conventional wireless networking equipment because of the many different security standards or protocols available. Such security standards include, e.g., the Wired Equivalent Privacy (WEP) and Wi-Fi Protected Access (WPA), both of which typically involve the use of network passwords for wireless networking by the client devices. Other security standards, such as media access control (MAC) filtering, use a unique physical hardware identification or address of the client device to allow access by the client device to the wireless network. However, such security measures often require the adjustment of security settings within the router or other access control device, which can be a relatively complex process for many network and client device end users. As a result, end users often do not activate many of the security features available for wireless network devices, including 802.11x wireless networking devices.

Figure 2:
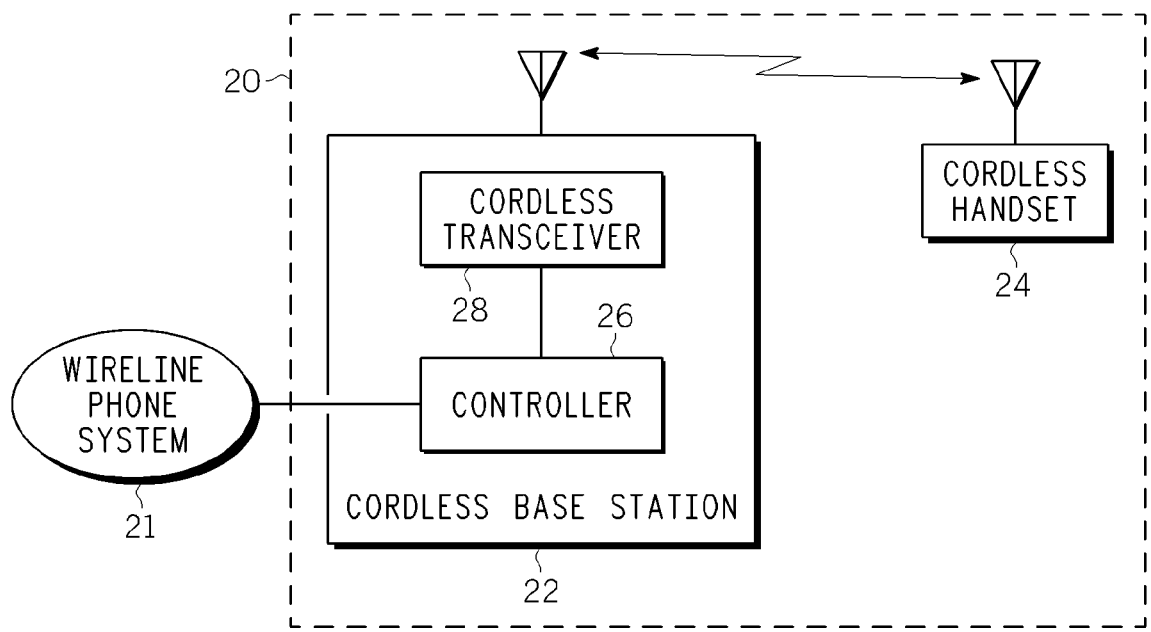
FIG. 2 is a block diagram of a conventional system including a cordless telephony device.

Referring now to FIG. 2, shown is a block diagram of a conventional system 20 including a cordless telephony device. The conventional cordless telephony device typically includes a cordless base station 22 and one or more cordless portable handsets 24. The cordless base station 22 is connected to a wireline phone system 21, such as a telephone company phone system, via a telephone landline.

The cordless base station 22 typically includes a controller 26 and a cordless transceiver or radio transceiver 28 coupled to the controller 26. The cordless transceiver 28 is configured to communicate wirelessly with the cordless handset 24, which also includes a cordless or radio transceiver (not shown). The controller 26 controls the operation of the cordless telephone device, including the wireless communication between the base station 22 and the handset 24, and between the base station 22 and the wireline phone system 21, e.g., via an phoneline interface (not shown). The cordless base station 22 has an assigned landline telephone number that allows a user to place and receive calls using the cordless portable handset 24 within a limited range of the cordless base station 22, such as within a home.

Before the base station 22 will recognize the handset 24 and be able to communicate therewith, the handset 24 must be registered with the base station 22, e.g., using a pairing sequence, which creates a unique and encrypted or private wireless link between the base station 22 and the handset 24. Typically, an end user initiates the handset registration process or pairing sequence by pressing one or more buttons on the handset and/or the base station. The pairing sequence typically is performed in accordance with one or more conventional standards, such as the Digital Enhanced (previously European) Cordless Telecommunications (DECT) standard, its North American variant, Worldwide Digital Cordless Telecommunications (WDCT) standard, and the Bluetooth™ wireless standard.

Figure 3:
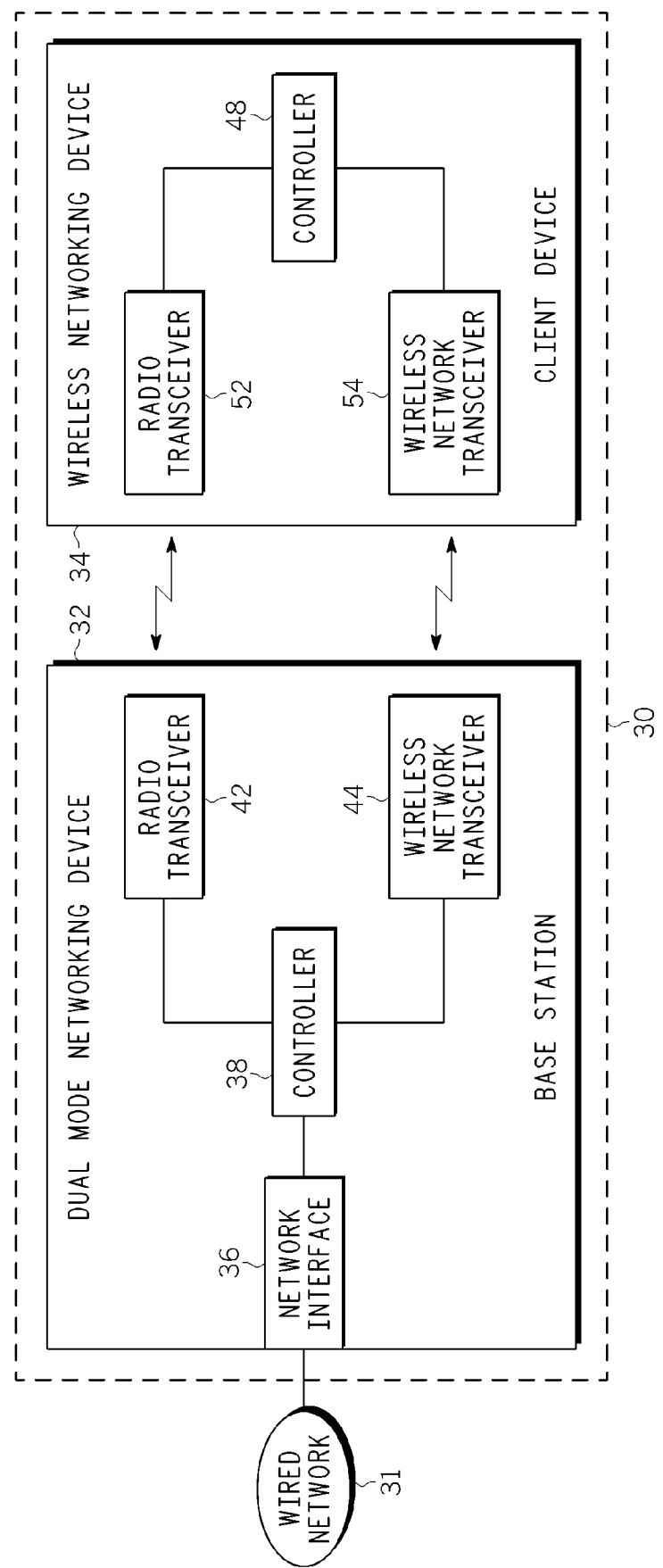
FIG. 3 is a block diagram of a system for configuring wireless networking using dual mode wireless networking devices, such as a dual mode cordless telephone base station device and a dual mode wireless networking client device.

Referring now to FIG. 3, shown is a block diagram of a wireless network system 30 for configuring wireless networking using dual mode wireless networking devices. Using dual mode wireless networking devices, such as a dual mode cordless telephone base station and one or more dual mode wireless networking client devices, setting up or authenticating the client devices within the wireless network system is greatly simplified compared to conventional wireless networking processes, e.g., authentication processes involving 802.11x wireless networking devices.

Conventionally, wireless networking devices are not dual mode devices, i.e., they typically have a wireless network transceiver but not a radio transceiver. Thus, conventional wireless networking devices must wirelessly transmit and receive network configuration data via their respective wireless network transceivers, or load such data manually, e.g., via a keypad or graphical user interface. However, conventional wireless network transceivers and their controllers often are not configured to exchange network configuration data in a manner that is relatively simple and nearly automatic. Yet, devices to be authenticated need network configuration data before a communication link between their respective wireless network transceivers can be established and the client devices can be allowed access to the wireless network. However, radio transceivers, such as those used in cordless telephone base stations and their corresponding handsets, usually are much more user-friendly to initiate and execute data transfer processes, e.g., registering one or more handsets to a given base station.

Therefore, by using dual mode wireless networking devices, i.e., devices that include both a wireless network transceiver and a radio transceiver, wireless network devices can make use of the relative user-friendly radio transceivers to transmit and receive network configuration data. The network configuration data then can be transferred from the device's radio transceiver to the device's wireless network transceiver, e.g., using the device's controller, rather than having to obtain the network configuration data via the device's wireless network transceiver. Once the device's wireless network transceiver has the appropriate network configuration data, the device can establish a wireless network communication link with a similar wireless networking device, e.g., a dual mode base station base, via their respective wireless network transceivers.

The system 30 includes a first dual mode wireless networking device 32, such as a dual mode cordless telephone base station, and a second dual mode wireless networking device 34, such as an 802.11x networking client device. All or a portion of the first dual mode wireless networking device 32 and/or the second dual mode wireless networking device 34 can be comprised of any suitable structure or arrangement, e.g., one or more integrated circuits.

Each of the first and second dual mode wireless networking devices can be any suitable dual mode device capable of being incorporated into any suitable wireless or wired network, such as a Bluetooth wireless network, an 802.11b wireless network, an 802.11a wireless network, an 802.11 g wireless network, an 802.11h wireless network, an 802.11e wireless network, a Digital Enhanced Cordless Telecommunications (DECT) wireless network, a 900 MHz Cordless Telephone wireless network, a 2.4 GHz Cordless telephone wireless network, a HomeRF™ wireless network, a Home Phone Line Networking Alliance (HPNA) wired network, a Home Plug™ wired network, a 10/100BaseT Ethernet wired network, a Universal Serial Bus (USB) wired network, and an IEEE 1394 wired network.

For example, the first dual mode wireless networking device 32 can be a cordless telephone base station, a signal converter or digital set-top box, a wireless networking computing device or video device, a wireless router, a residential gateway, a home area network (HAN) or media server system, or any other suitable device with dual mode capability. Also, for example, the second dual mode wireless networking device 34 can be any suitable dual mode client device, such as a cordless telephone handset, a cellular telephone, including cellular phones with additional cellular radios, a computer, a television, an audio receiver, a video receiver, a printer, a wireless router, a digital camera, a personal digital assistants (PDA) or other suitable dual mode device. Although the first dual mode wireless networking device 32 is described and shown herein as a cordless telephone base station, it should be understood that the first dual mode wireless networking device 32 can be any suitable dual mode wireless networking device. Similarly, although the second dual mode wireless networking device 34 is described and shown herein as a wireless client device, it should be understood that the second dual mode wireless networking device 34 can be any suitable dual mode wireless networking device.

Either one or both of the first dual mode wireless networking device 32 and the second dual mode wireless networking device 34 can be partially or completely configured in the form of hardware circuitry and/or other hardware components within a larger device or group of components. Alternatively, either one or both of the first dual mode wireless networking device 32 and the second dual mode wireless networking device 34 can be partially or completely configured in the form of software, e.g., as processing instructions and/or one or more sets of logic or computer code. In such configuration, the logic or processing instructions typically are stored in a data storage device (not shown), which typically is coupled to a processor or controller. The processor accesses the necessary instructions from the data storage device and executes the instructions or transfers the instructions to the appropriate location within the respective device.

The first dual mode wireless networking device 32 includes a network interface 36, a processor or controller 38 coupled to the network interface 36, a radio transceiver 42 coupled to the controller 38 and a wireless network transceiver 44 coupled to the controller 38. One of more of the network interface 36, the controller 38, the radio transceiver 42 and the wireless network transceiver 44 can be comprised partially or completely of any suitable structure or arrangement, e.g., one or more integrated circuits. Also, it should be understood that the first dual mode wireless networking device 32 includes other components, hardware and software (not shown) that are used for the operation of other features and functions of the device 32 not specifically described herein.

The controller 38, in general, controls the operation of the first dual mode wireless networking device 32, including wired or wireless communication between the first dual mode wireless networking device 32 and the wired network 31, e.g., via the network interface 36. The controller also controls wireless communication between the first dual mode wireless networking device 32 and the second dual mode wireless networking device 34 and/or other wireless networking devices (not shown), e.g., via the radio transceiver 42 and the wireless network transceiver 44.

The second dual mode wireless networking device 34 includes a processor or controller 48, a radio transceiver 52 coupled to the controller 48, and a wireless network transceiver 54 coupled to the controller 48. One or more of the controller 48, the radio transceiver 52 and the wireless network transceiver 54 can be comprised partially or completely of any suitable structure or arrangement, e.g., one or more integrated circuits. Also, it should be understood that the second dual mode wireless networking device 34 includes other components, hardware and software (not shown) that are used for the operation of other features and functions of the 34 not specifically described herein.

The controller 48 controls the operation of the client device 34, including the wireless communication between the client device 34 and the base station 32. For example, as will be discussed in greater detail hereinbelow, the controller 48 controls the wireless communication between the client device 34 and the base station 32 via the radio transceiver 52 and via the wireless network transceiver 54.

Figure 4:
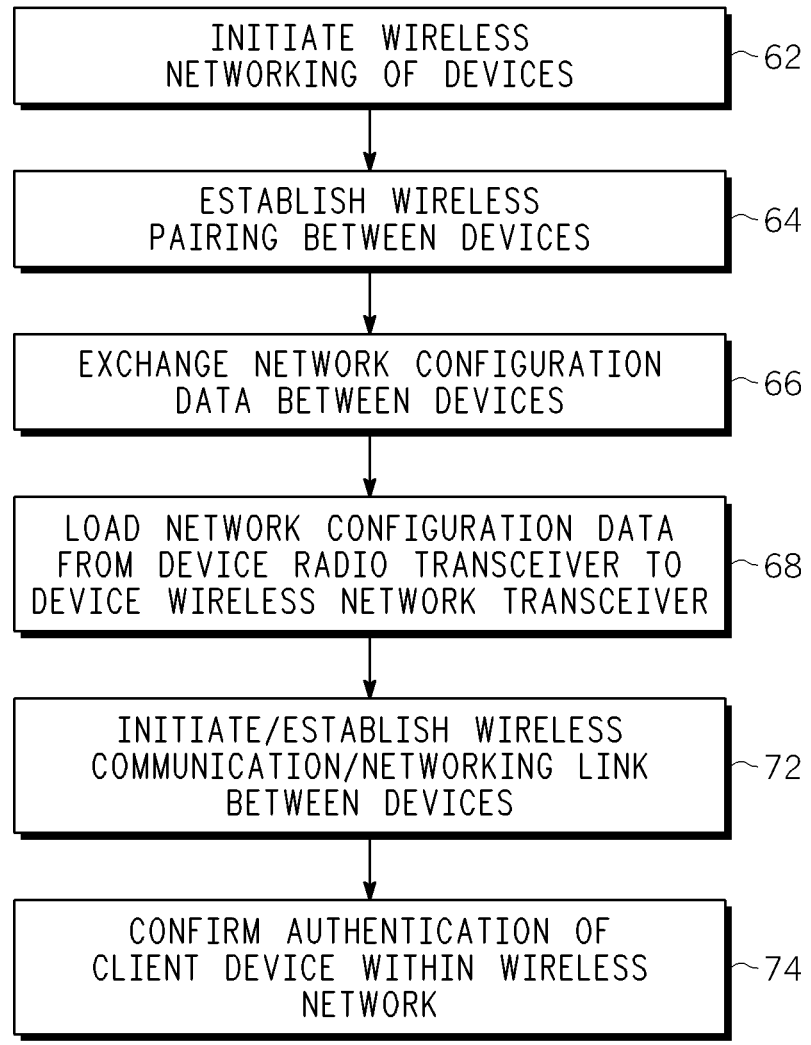
FIG. 4 is a flow chart that schematically illustrates a method for configuring wireless networking using dual mode wireless networking devices.

Referring now to FIG. 4, with continuing reference to FIG. 3, shown is a flow chart that schematically illustrates a method 60 for configuring wireless networking using dual mode wireless networking devices. The method 60 will be described along with the operation of the first dual mode networking device 32 and the second dual mode wireless networking device 34.

The method 60 includes a step 62 of initiating the wireless networking configuration or authentication process between the base station 32 and the client device 34. The initiating step 62 typically involves pressing a button on the base station 32 and/or the client device 34, similar to initiating the registration process between a handset and a base station in a cordless telephony system. Alternatively, the initiating step 62 can include selecting an initiation option from an on-screen menu, or other suitable means for initiating the registration process.

The initiating step 62 is a relatively simple and easy step compared to initiating conventional processes for setting up or authenticating wireless networking devices within conventional wireless networks. In conventional wireless networks, initiating an authentication process between devices typically involves adjusting several hardware and/or software settings within one or more of the respective devices. As discussed hereinabove, such conventional authentication processes can be relatively complex for a wireless network end user.

In the method 60, once the networking configuration process has been initiated, the method 60 performs a step 64 in which a wireless pairing, such as a pairing sequence, is established between the base station device 32 and the client device 34. That is, in general, the step 64 creates or establishes a unique and encrypted wireless link between the radio transceiver 42 of the base station device 32 and the radio transceiver 52 of the client device 34. It should be understood that other suitable forms of registration between the base station device 32 and the client device 34 are possible. In the base station device 32, the step 64 is performed by the controller 38 and the radio transceiver 42, or other suitable component or components in the device. In the client device 34, the step 64 is performed by the controller 48 and the radio transceiver 52, or other suitable component or components in the device 34.

The pairing step 64 can be performed in any suitable manner, e.g., in a conventional manner. As discussed hereinabove, pairing sequences include those in accordance with the Digital Enhanced (previously European) Cordless Telecommunications (DECT) standard, its North American variant, Worldwide Digital Cordless Telecommunications (WDCT) technology, and other suitable standards.

Once the base station device 32 and the client device 34 device have been wirelessly paired, via their respective radio transceivers, the method 60 performs a step 66 in which the respective controllers of the wirelessly-paired devices exchange network configuration data wirelessly using the respective radio transceivers as the wireless data path. As discussed hereinabove, network configuration data, in general, is information relating to one or more wireless network devices that is needed to authenticate wireless network devices and to allow wireless network communication links between the wireless networking devices via their respective wireless network transceivers. As discussed hereinabove, conventionally, the transfer of such network configuration data is not performed using radio transceivers, as most wireless networking devices are not dual mode devices that include radio transceivers.

For example, 802.11x networking devices, network configuration data can include 802.11x configuration data, such as data relating to the name of the wireless network, which is known as its service set identifier (SSID), the channel that is to be used within the wireless network (e.g., the router channel), and one or more security keys. Other configuration data includes subscriber information, such as the subscriber telephone number, and subscriber service related information, such as the service provider and features provided to the subscriber by the service provider.

Once sufficient network configuration data has been exchanged between the base station 32 and the client device 34, the method 60 performs a step 68 in which the controller or other suitable component or components in each device loads or transfers network configuration data to its respective wireless network transceiver. That is, in the base station 32, any network configuration data received or otherwise accessible by the controller 38 is loaded or transferred from the radio transceiver 42 or other device locations into the device wireless network transceiver 44. Similarly, in the client device 34, network configuration data received or otherwise accessible by the controller 48 is transferred from the radio transceiver 52 or other device locations to the device wireless network transceiver 54.

The method also includes a step 72 in which the base station 32 and the client device 34, via their respective wireless network transceivers, initiate or establish a wireless communication link or wireless networking link between the devices. The step 72 includes establishing a wireless networking link between the wireless network transceiver 44 and the wireless networking transceiver 54 based on the network configuration data that was received by or otherwise accessed by the respective device controllers, e.g., via the loading step 68. The wireless communication or networking link is established to allow the client device 34 to become authenticated by the base station 32 and therefore allowed access to the wireless network to which the base station 32 belongs.

Once the client device 34 has been authenticated or associated with the base station 32, i.e., the client device 34 has been recognized as a wireless networking device and allowed access to the wireless network, the method 60 can include a step 74 of confirming authentication of the client device 34 within the wireless network. The confirming step 74 can include any suitable form of confirmation, e.g., an LED, text or graphic display on the client device 34 and/or the base station 32. Alternatively, the confirming step 74 can include one or more audible signals from the client device 34 and/or the base station 32 confirming the recognition of the client device 34 as a wireless networking device within the wireless network.

The method shown in FIG. 4 described herein may be implemented in a general, multi-purpose or single purpose processor. Such a processor will execute instructions, either at the assembly, compiled or machine-level, to perform that process. Those instructions can be written by one of ordinary skill in the art following the description of the wireless networking configuration method described herein and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the method, apparatus and system for configuration of wireless networking herein described without departing from the spirit and scope of the invention as defined by the appended claims and their full scope of equivalents.

The invention claimed is:

1. A method for establishing a wireless communication/networking link between a first dual mode device and a second dual mode device, the first dual mode device including a radio transceiver and a wireless networking transceiver, the second dual mode device including a radio transceiver and a wireless networking transceiver, the method comprising:

establishing a first connection between the first dual mode device and the second dual mode device, the first connection comprising a wireless pairing between the first dual mode device radio transceiver and the second dual mode device radio transceiver and creating a secure first wireless link between the first dual mode device radio transceiver and the second dual mode device radio transceiver;

wirelessly exchanging network configuration data comprising at least one of: (i) server set identification (SSID) information of a wireless network, (ii) channel information of the wireless network, (iii) security key information of the wireless network, (iv) subscriber information, and (v) subscriber service provider information, between the first dual mode device and the second dual mode device over the secure first wireless link before the first dual mode device accesses the wireless network, using the first dual mode device radio transceiver and the second dual mode device radio transceiver; and establishing, based on the network configuration data, a second connection between the first dual mode device and the second dual mode device, the second connection comprising a second wireless communication/networking link between the first dual mode device networking transceiver and the second dual mode device networking transceiver, wherein after the second wireless communication/networking link is established, the first dual mode device is authenticated by the second dual mode device, and wherein in response to being authenticated by the second dual mode device, the first dual mode device accesses the wireless network.

2. The method as recited in claim 1, wherein establishing the first connection further comprises initiating a wireless pairing sequence between the first dual mode device radio transceiver and the second dual mode device radio transceiver.

3. The method as recited in claim 2, wherein the wireless pairing sequence includes at least one sequence selected from the group consisting of pairing sequences in accordance with the Digital Enhanced Cordless Telecommunications (DECT) standard, pairing sequences in accordance with the Worldwide Digital Cordless Telecommunications (WDCT) standard, and the Bluetooth wireless standard.

4. The method as recited in claim 1, further comprising confirming the establishment of the second wireless communication/networking link between the first dual mode device and the second dual mode device.

5. The method as recited in claim 1, wherein wirelessly exchanging the network configuration data between the first dual mode device and the second dual mode device over the secure first wireless link before the first dual mode device accesses the wireless network further comprises wirelessly exchanging 802.11x configuration data between the first dual mode device and the second dual mode device using the first dual mode device radio transceiver and the second dual mode device radio transceiver.

6. The method as recited in claim 1, wherein wirelessly exchanging the network configuration data between the first dual mode device and the second dual mode device over the secure first wireless link before the first dual mode device accesses the wireless network further comprises wirelessly exchanging configuration data that includes at least one of server set identification (SSID) information, channel information, security key information, subscriber information, and subscriber service provider information.

7. A first dual mode wireless networking device, comprising:

a first radio transceiver configured to wirelessly exchange network configuration data with a second radio transceiver of a second dual mode wireless networking device;

a first wireless network transceiver configured to establish a first connection between the first dual mode wireless networking device and the second dual mode wireless networking device, the first connection comprising a wireless communication/networking link with a second wireless network transceiver of the second dual mode networking device; and a controller coupled between the first radio transceiver and the first wireless network transceiver, wherein the controller is configured to initiate a wireless pairing between the first dual mode networking device and the second dual mode networking device via the first radio transceiver and the second radio transceiver and create a secure first wireless link between the first dual mode networking device and the second dual mode networking device via the first radio transceiver and the second radio transceiver, wherein the controller is configured to wirelessly exchange the network configuration data, the network configuration data comprising at least one of: (i) server set identification (SSID) information of a wireless network, (ii) channel information of the wireless network, (iii) security key information of the wireless network, (iv) subscriber information, and (v) subscriber service provider information, with the second dual mode networking device over the secure first wireless link before the first dual mode networking device accesses the wireless network, via the first radio transceiver when the first dual mode networking device is paired with the second dual mode networking device, wherein the controller is configured to transfer network configuration data to the first wireless network transceiver, including network configuration data received by the first radio transceiver from the second radio transceiver, and wherein the controller is configured to initiate an establishment of a second connection between the first dual mode wireless networking device and the second dual mode wireless networking device, the second connection comprising a second wireless communication/networking link between the first wireless network transceiver and the second wireless network transceiver, wherein the second wireless communication/networking link is based on the network configuration data and wherein after the second wireless communication/networking link is established, the first dual mode wireless networking device is authenticated by the second dual mode wireless networking device, and wherein in response to being authenticated by the second dual mode wireless networking device, the first dual mode wireless networking device accesses the wireless network.

8. The device as recited in claim 7, wherein the first dual mode networking device further comprises a dual mode networking device selected from the group consisting of a cordless telephone base station, an 802.11x networking device, a signal converter box, a digital set-top box, a residential gateway, a home area network (HAN) server, a wireless router, a desktop personal computer (PC), a laptop PC, a notebook PC, a PC printer, a digital camera, a personal digital assistant (PDA), a television, an audio receiver, a video receiver, a cordless telephone handset, a cellular telephone, and a cellular telephone with additional cellular radios.

9. The device as recited in claim 7, wherein the first radio transceiver further comprises a cordless telephone radio transceiver.

10. The device as recited in claim 7, wherein the first wireless network transceiver further comprises an 802.11x networking transceiver.

11. The device as recited in claim 7, wherein the controller is configured to initiate a wireless pairing sequence between the first radio transceiver and the second radio transceiver, wherein the wireless pairing sequence includes at least one wireless pairing sequence selected from the group consisting of pairing sequences in accordance with the Digital Enhanced Cordless Telecommunications (DECT) standard, pairing sequences in accordance with the Worldwide Digital Cordless Telecommunications (WDCT) standard, and the Bluetooth wireless standard.

12. The device as recited in claim 7, wherein the network configuration data comprises 802.11x configuration data.

13. The device as recited in claim 7, wherein at least a portion of the controller is implemented in software executed by a computer.

14. The device as recited in claim 7, wherein at least a portion of the controller is implemented in hardware.

15. The device as recited in claim 7, wherein at least a portion of at least one of the first radio transceiver, the first wireless network transceiver and the controller further comprises an integrated circuit.

16. A wireless network system, comprising:
a first dual mode networking device having a first radio transceiver and a first wireless network transceiver; and
a second dual mode networking device having a second radio transceiver and a second wireless network transceiver, wherein the first dual mode networking device and the second dual mode networking device are configured to establish a first connection between the first dual mode networking device and the second dual mode networking device, the first connection comprising a wireless pairing between the first radio transceiver and the second radio transceiver and creating a secure first wireless link between the first radio transceiver and the second radio transceiver, wherein the first radio transceiver and the second radio transceiver are configured to wirelessly exchange network configuration data therebetween comprising at least one of: (i) server set identification (SSID) information of a wireless network, (ii) channel information of the wireless network, (iii) security key information of the wireless network, (iv) subscriber information, and (v) subscriber service provider information, over the secure first wireless link when the wireless pairing has been established between the first dual mode networking device and the second dual mode networking device, before the first dual mode networking device accesses the wireless network, wherein the first dual mode networking device and the second dual mode networking device are configured to establish a second connection between the first dual mode networking device and the second dual mode networking device, the second connection comprising a second wireless communication/networking link between the first wireless network transceiver and the second wireless network transceiver, wherein the second wireless communication/networking link is based on network configuration data, including the network configuration data exchanged between the first radio transceiver and the second radio transceiver, and wherein after the second wireless communication/networking link is established, the first dual mode networking device is authenticated by the second dual mode networking device, and wherein in response to being authenticated by the second dual mode wireless networking device, the first dual mode wireless networking device accesses the wireless network.

17. The system as recited in claim 16, wherein at least one of the dual mode networking devices includes a controller coupled between the radio transceiver and the wireless network transceiver, wherein the controller is configured to initiate the wireless pairing by the radio transceiver, to transfer network configuration data between the radio transceiver and the wireless network transceiver, and to initiate the establishment of the second wireless communication/networking link by the wireless network transceiver.

18. The system as recited in claim 16, wherein at least one of the dual mode networking devices further comprises a dual mode networking device selected from the group consisting of a cordless telephone base station, an 802.11x networking device, a signal converter box, a digital set-top box, a residential gateway, a home area network (HAN) server, a wireless router, a desktop personal computer (PC), a laptop PC, a notebook PC, a PC printer, a digital camera, a personal digital assistant (PDA), a television, an audio receiver, a video receiver, a cordless telephone handset, a cellular telephone, and a cellular telephone with additional cellular radios.

19. The system as recited in claim 16, wherein at least a portion of at least one of the dual mode networking devices is implemented in software executed by a computer.

20. The system as recited in claim 16, wherein at least a portion of at least one of the dual mode networking devices is implemented in hardware.

* * * * *